United States Patent [19]

Okazaki et al.

[11] 3,891,451

[45] June 24, 1975

[54] THERMOPLASTIC TRAFFIC PAINT

[75] Inventors: Hiroyuki Okazaki; Isao Yuji, both of Toyonaka; Masayuki Yui, Ikoma, all of Japan

[73] Assignee: Sumitomo Chemical Co., Ltd., Osaka, Japan

[22] Filed: Mar. 13, 1974

[21] Appl. No.: 450,683

[30] Foreign Application Priority Data

Nov. 1, 1973 Japan............................ 48-123643

[52] U.S. Cl................ 106/30; 106/241; 260/37 R; 260/38; 260/39 P; 260/42.21
[51] Int. Cl........................... C08f 45/66; E01f 9/08
[58] Field of Search................ 106/241, 20, 30, 26; 260/176, 37, 41, 42.21

[56] References Cited
UNITED STATES PATENTS
2,739,146   3/1956   Weigele et al...................... 260/176

OTHER PUBLICATIONS
Chem. Abst. 71:4250b.

*Primary Examiner*—Theodore Morris
*Attorney, Agent, or Firm*—Stevens, Davis, Miller & Mosher

[57] ABSTRACT

A thermoplastic traffic paint containing as a pigment, an aged product of 4,4'-bis [acetoacet-(2'',5''-dimethoxy-4''-chloro) anilido-2-azo] -3,3'-dichlorodiphenyl.

6 Claims, No Drawings

THERMOPLASTIC TRAFFIC PAINT

The present invention relates to a thermoplastic traffic paint, and more particularly to a thermoplastic traffic paint contining at least one pigment, at least one filler and at least one natural or synthetic resin characterized in that said pigment is a compound obtained by aging 4,4'-bis [acetoacet-(2'',5''-dimethoxy-4''-chloro)anilido-2-azo]-3,3'-dichlorodiphenyl.

A traffic paint, which is either white or yellow, is applied to road-marking such as road surface, center line, lane line, stop line, pedestrian crossing, runway of airfield and the like, and is essential for the effective and safe use of limited road surface. The traffic paint has three types according to the application methods, an air-dry type, hot-spray type and thermoplastic type. An object of the present invention is to provide a useful traffic paint for the thermoplastic types.

The conventional coloring component which has generally been incorporated in the yellow thermoplastic traffic paint, is cadmium yellow pigment alone or a mixture thereof with coated chrome yellow (having better heat resistance) pigment. In recent years, however, the environmental pollution problems resulting from heavy metals have made very difficult the use of cadmium yellow and chrome yellow pigments which contain as a major component heavy metals such as cadmium, lead and chromium. Therefore development of pollution-free colorant has commercially been required strongly as a substitute for these pigments. Moreover, a traffic paint of high re-reflectivity at night has lately been required fairly strongly for the purpose of strengthening traffic safety.

Very severe requirements are imposed on the performance of thermoplastic traffic paint, and consequently on the property of colorants to be incorporated therein. For example, a fairly high resistance to heat is required to pigment, because the marking materials (containing pigments, resins and fillers) are applied to road after they were melted by heating. Moreover, an excellent resistance to weather is also essential because the paint is almost used outdoors.

Although considerable kinds of yellow colorant (pigment) are now on the market, any colorant among them can not be a subsistitute for inorganic cadmium yellow and chrome yellow pigments, when used for a traffic paint. Therefore, if a new substitute which satisfies the above requirements is to be searched for, it should necessarily be done among organic pigments.

As a result of extensive studies to find out a pigment suitable for the aforesaid applications from the organic yellow pigments which are now on the market, and which were newly prepared by the inventors, the inventors previously found that the above-named pigment i.e., 4,4'-bis [acetoacet-(2'',5''-dimethoxy-4''-chloro)anilido-2-azo]-3,3'-dichlorodiphenyl, which is well known as so-called C.I. Pigment Yellow 83 represented by the formula,

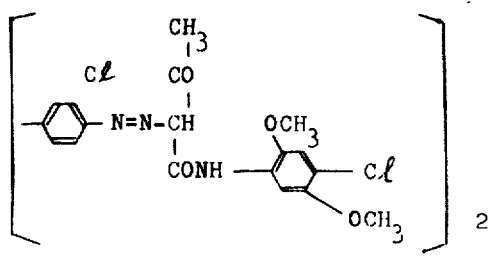

has a very excellent property as a pigment used for the thermoplastic traffic paint. In order to improve the traffic paint, the present inventors have further investigated and found that the aged product of above-named pigment exhibits superior properties, such as resistances to ˜heat and wether, and particularly re-reflectivity at night.

The thermoplastic traffic paint of the present invention comprires at least one filler and at least one natural and/or synthetic resin in addition to the present pigment, and may contain, if necessary, a small amount of other organic, inorganic or extender pigments and the other materials.

The fillers used in the present invention include crushed marbles, white sands, silicasands and glass beads. The synthetic resins include petroleum resins, melamine resins, syntheic rubbers, phthalic resins, acrylic resins, phenolic resins and epoxy resins. And as the natural resins, there are exemplified naturally occurring resins such as rosin.

The pigment of the present invention may be used as it is, or in the form of the so-called conditioned pigment which can be formulated by incorporating other pigments, additives and treating agents. That is, the pigment may be used in the form of 1. pigment compositions formulated, for example, by mixing or simultaneously pulverizing the present pigment together with other one or more pigments, 2. dry colors (conditioned pigment) formulated using higher fatty acids or metallic salts thereof, 3. color pastes formulated using plasticizers such as DOP (dioctyl phthalate) and DBP (dibutyl phthalate) and 4. color chips and color master batches formulated by dispersing pigments into resins compatible with the system to be applled.

Other organic and inorganic pigments and extender pigments which may be used, if necessary, in the present invention include various pigments shown in Pigment Hand-book, second edition, pp. 2 and pp. 7–49 (complied by Japan Pigment Technical Association and published by Seibundo Shinkosha). Among the pigments, those which can meet the severe requirements such as non-pollution, excellent resistances to heat and weather, and at the same time low cost, include titanium dioxide as white pigments, precipitated barium sulfate and precipitated caluim carbonate as extender pigments, and carbon black and red iron oxide as colored inorganic pigments. Colored organic pigments other than yellow pigments include phthalocyanine, quinacridone, perinone and dioxazine type ones all of which are used for color-matching. As mentioned above, it is very difficult to find other yellow pigments which can meet the object of the present invention appropriately, except the present pigment, that is, aged C.I. Pigment Yellow 83.

The aging treatment referred to herein means that the wet cake or powder of the present pigment obtained by the common coupling methods is treated by 1. heating in an organic solvent,
2. heating in an aqueous alkali solution or
3. heating under an increased pressure in an organic solvent or in an aqueous alkali solution.

As the organic solvents used in 1, there are exemplified aromatic and aliphatic solvents, for example waterinsoluble solvents such as xylene, toluene, o-dichlorobenzene, monochlorobenzene and trichlorobenzene; and dipolar aprotic solvents such as dimethylformamide, dimethylsulfoxide, butanol and octanol, and a mixture thereof. The treatments in the organic solvents are carried out at about 80° to about 150°C for about 1 to about 10 hours.

As the aqueous alkali solutions used in 2, there are used alkali metal hydroxides such as sodium hydroxide and potassium hydroxide, and alkali metal carbonates such as sodium carbonate, potassium carbonate and sodium bicarbonate alone or mixtures thereof in the form of about 0.1 to about 20 percent aqueous solution. The treatments in the aqueous solutions are carried out at about 60° to about 100°C for about 1 to about 10 hours.

The treatments under pressure in 3 are carried out at about 0.1 to about 5 kg/cm$^2$ (gauge) for about 1 to about 10 hours according to the methods of 1 and 2.

The aged pigment has particles which are more uniform in shape and larger in size than untreated pigment. The particle size of untreated pigment is about 0.01 to about 0.05 $\mu$ and the particle shape is not uniform and is diverse from spheres to colums when it is observed on electronmicroscopic photograph. On the other hand the particle size of the aged pigment is about 0.05 to about 0.5 $\mu$ and the particle shape is approximately uniform colums. Further the property in the thermoplastic traffic paint is improved.

From the comparative result between the traffic paints formulated with each of the aged pigment and untreated pigment, it is confirmed that the aged pigment exhibits a little improved resistances to heat and weather, and surprisingly, remarkably improved re-reflectivity at night over the untreated pigment.

The other materials which may be contained, include surfactants and plasticizers as the control agent of paint viscosity, and materials for improving the property of the paint film.

The formulation of the thermoplastic traffic paints of the present invention will be illustrated in more details as follows.

The aforesaid resin, filler and pigment and if necessary other materials are added to a melting apparatus and thoroughly mixed under heating to prepare a uniform molten mixture. The mixing can be carried out for a short time in the apparatus equipped with a stirrer and a heating device such as a gas burner, however for avoiding the degradation of resins and pigments due to local heating, it is desirable to use a melter with both heat-controller and a highly efficient stirrer. The heating time and temperature depend upon the types of melting apparatus and resins used, however in general the formulation is carried out at 150° to 220°C within 1 hour, and preferably at below 200°C within 30 minutes.

For obtaining the same shade as that of the yellow line being applied on raod, or cadmium yellow or chrome yellow, and for obtaining the same excellent physical property such as hiding power or consistency as that of paint with cadmium yellow or chrome yellow incorporated therein, it is preferred to use a white pigment such as titanium dioxide in combination with the present pigment. The mixing ratio by weight of the present pigment to white pigment may be 5–95: 95–5, and in the case of titanium dioxide the ratio is preferably 90–30: 10–70. In some cases where the melt viscosity of formulated paint is increased because of the kinds of resin incorporated in paint and the mixing ratios of the resins, pigments and fillers, so that the paint is very difficult to apply, it is desirable to control the viscosity properly by adding plasticizers such as DOP (dioctylphthalate) and DBP (dibutylphthalate), natural oils such as tung oil, or surfactants to the paint in the proportion of below several percent based on the whole system. In the traffic paints the weight ratio of each material is not especially fixed and is determined by the property to be desired, namely the flow of paints, the fastness of paint film, the adhesiveness to the road and so, but usually the ratio of resins is 20–30 percent by weight based on the whole system, filler including the extender pigments and glass beads 40–70 percent by weight, yellow colorant 0.5–10 percent by weight and the other materials several percent by weight.

The traffic paint thus prepared can be applied to road durable yellow according to the thermoplastic type application.

The present invention will be illustrated with reference to the following examples, which are only given for the purpose of illustration and not to be interpreted as limiting.

Part and percent in the Example are by weight.

EXAMPLE

1. Preparation of pigment

To 200 parts of water wwere added 16.3 parts of 3,3'-dichlorobenzidine hydrochloride and 16 parts of a 35 percent hydrochloric acid, and the mixture was heated at 80°C to make a complete solution. The solution was cooled down to below 5°C with the addition of 150 parts of ice water, and then tetrazotized by adding 28.4 parts of a 25 percent aqueous sodium nitrite solution at a time while kept at 0° to 5°C.

The solution was stirred for 30 minutes after addition of sodium nitrite, clarified with 2.0 parts of active carbon, filtered, and then an excess of nitrite ion in the filtrate was eliminated with sulfamic acid, whereby the tetrazo solution was obtained.

On the other hand, 29.9 parts of acetoacet(2,5-dimethoxy-4-chloro)anilide and 10 parts of a 48 percent sodium hydroxide were added to 500 parts of water to make a complete solution, then 50 parts of crystalline sodium acetate were added thereto, followed by a dropwise addition of 85 parts of a dilute formic acid for acid precipitation.

The solution thus obtained was adjusted to 5° to 10°C and coupled with the tetrazo solution previously prepared by a dropwise addition of the tetrazo solution.

After completion of the coupling reaction was confirmed, the solution was stirred for 30 minutes, filtered and washed to obtain pigment wet cake. Yield (dry product): 40.5 parts.

The wet cake thus obtained was used as it is or after drying. And it was found under an electron microscope that the pigment particles were diverse from spheres to columns in shape and were around 0.05 $\mu$ in size.

2. Aging treatment i. Aging in an organic solvent 10 parts of the pigment powders obtained in (1) were added to 500 parts of o-dichlorobenzene (hereinafter referred to as ODCB), aged at 130°C for 5 hours, filtered and dried.

The pigment powders thus obtained were observed on electron-microscopic photograph and it was found that the pigment particles were approximately uniform columns in shape, and were about 0.4 μ in length and about 0.1 μ in width.

ii. Aging in an aqueous alkali solution

The pigment wet cake obtained in (1) (10 parts as a dry basis) was added to 500 parts of a 5 percent aqueous sodium hydroxide, aged at 90°C for 5 hours, filtered, washed with water and dried.

The aged pigment powders thus obtained were observed on electron-microscopic photograph, and it was found that the pigment particles were approximately uniform columns in shape and were about 0.3 μ in length and about 0.05 μ in width.

iii. Pressurized aging in autoclave with an aqueous alkali solution

The pigment wet cake obtained in (1) (10 parts as a dry basis) was added to 500 parts of a 5 percent aqueous sodium hydroxide, aged in an autoclave at 130°C for 5 hours, filtered, washed with water and dried.

The aged pigment powders thus obtained were observed on electron-microscopic photograph, and it was found that the pigment particles were approximately uniform columns in shape and were about 0.3 μ in length and about 0.05 μ in width.

3. Performance of pigment incorporated in traffic paint i. Preparation of pigment composition (conditioned pigment)

The organic pigments obtained in (1) and (2) were each pulverized together with titanium dioxide in the amount shown in Table 1 by an atomizer to prepare each pigment composition (conditioned pigment).

Table 1

|  | Colorant (pigment composition) | | | |
| --- | --- | --- | --- | --- |
|  | A | B | C | D |
| Pigment used (C.I. Pigment Yellow 83) | Non-treated (reference) | Alkali-treated [2]-(ii)] | Alkali-treated in autoclave [2]-(iii)] | ODCB-treated [2]-(i)] |
| Amount (part) | 70 | 70 | 70 | 70 |
| TiO₂ (rutille)* Amount (part) | 30 | 30 | 30 | 30 |
| Total | 100 | 100 | 100 | 100 |

Note:
*A 50 : 50 mixture of rutile type titanium dioxide and extender pigment (for example calcium carbonate).

ii. Preparation of test panels

The composition comprising ingredients shown in Table 2 were each formulated into a traffic paint by thoroughly mixing in a fluid state at 190° to 200°C. The test panels were prepared according to JIS K 5665–1971 5.6 on thermoplastic traffic paint, except that, in the case of test panels for the measurement of re-reflectivity at night, glass beads (Toshiba Glass Beads 153-T, a trademark of Tokyo Shibaura Electric Co., Ltd.) were uniformly distributed thereon coating.

Table 2

|  | Cadmopone yellow: chrome yellow = 1:1 (commercial product) | Colorant A — D obtained in (i) | |
| --- | --- | --- | --- |
| Yellow colorant | 6 part | 2 part | 2 part |
| Calcium carbonate | 24 | 28 | 28 |
| Rosin-modified maleic resin | 20 | 20 | 20 |
| Crushed marble (0.6 mm in diameter) | 30 | 30 | 30 |
| Glass beads (Toshiba glass beads 153-T) | 15 | 15 | 15 |
| DBP (dibutyl phthalate) | 3 | 3 | 3 |
| Tung oil | 2 | 2 | 2 |
| Total | 100 | 100 | 100 | iii. Test items and test methods

1. Color and tinting strength:

The color and the tinting strength were evaluated by comparison among the test panels prepared in (ii).

2. Risistance to heat:

The color changes obtained under the two conditions, 230°C × 3 hrs. and 200°C × 6 hrs., were evaluated by means of the gray scale for color change defined by JIS L-0804. The indication of "4" in Table 3 means that the color change corresponds to the color specimen No. 4 in the scale.

3. Resistance to weather:

The color changes obtained by an outdoor exposure (12 months) and on Sunshine weather-O-meter (600 hrs.) were evaluated by means of the gray scale for color change defined by JIS L-0804.

4. Resistance to chemicals:

a. The resistance of colorant

The test was carried out according to JIS K 5101–1964, 14. The chemicals used were 5 percent sulfuric acid, 5 percent hydrochloric acid and 5 percent sodium hydroxide aqueous solutions. The resistance was evaluated according to JIS L-0804.

b. The resistance of paint

The resistance to alkali was tested according to JIS K 5665, 5, 11, and evaluated according to JIS L-0804.

Furthermore, C.I. Pigment Yellow 83 has come up to the Positive List (P.L. Specification) on polyvinylchloride food-container and food-package and therefore it is a pigment which is safe to handle.

Table 3

| Colorant | | Cadmopone yellow: chrome yellow = 1:1 (commercial product) | Colorant | | | |
|---|---|---|---|---|---|---|
| | | | A | B | C | D |
| Amount of colorant used (in paint) | | 6 % | 2 % | 2 % | 2 % | 2 % | 2 % |
| Shade | | Standard | Greenish | Nearly standard | Nearly standard | Nearly standard | Neary standard |
| Tinting strength | | 100 % | 30–40 % | 100–105% | 100 % | 100 % | 100 % |
| Resistance to heat | | | | | | | |
| 230°C × 3 hrs | | 3 | 3 | 4–5 | 4–5 | 4–5 | 4–5 |
| 200°C × 6 hrs | | 3 | 3 | 4–5 | 4–5 | 4–5 | 4–5 |
| Resistance to weather | | | | | | | |
| Outdoor exposure (12 months) | | 1–2 | 1–2 | 3–4 | 4 | 4 | 4 |
| Sunshine weather-O-meter (600 hrs) | | 3 | 3 | 4 | 4 | 4 | 4–5 |
| Resistance to chemicals | | | | | | | |
| | HCl | 2 | — | 5 | 5 | 5 | 5 |
| Colorant | $H_2SO_4$ | 2–3 | — | 5 | 5 | 5 | 5 |
| | NaOH | 3 | — | 5 | 5 | 5 | 5 |
| Paint | $Ca(OH)_2$ | 5 | 5 | 5 | 5 | 5 | 5 |
| Re-reflectivity at night | | Standard | Very inferior | Inferior | Nearly standard | Nearly standard | Nearly standard |

5. Re-reflectivity at night:

The test was carried out in such a way that the test panels (15 cm in width by 30 to 50 cm in length) prepared in (ii) were placed on a road, and irradiated with a head-light of motor car 30 m apart from the panels. The re-reflectivity at night was evaluated visually.

iv. Test results

The results are listed in Table 3. As can be seen from the results, the colorant A, B, C and D have the tinting strength of about 3 times that of the 1:1 mixture of cadmopone yellow and chrome yellow which is now in a practical use. And the colorants B, C and D have the re-reflectivity at night which is approximately equal to that of the said 1:1 mixture of 3 times by weight of the colorant, thereby being very economical. Furthermore, the paints according to the present invention have excellent resistances to chemicals and weather, and have no danger of toxicity due to heavy metals.

The colorants B, C and D are so much superior to the colorant A in the re-reflectivity at night that, if the re-reflectivity is strongly required, the former three colorants (prepared from aged pigment) can be used for a thermoplastic traffic paint much more advantageously than the latter (prepared from untreated pigment). On the other hand, if the re-reflectivity is not strongly required, even the colorant A has a performance enough to be comparable to the former three.

What is claimed is:

1. In a thermoplastic traffic paint containing at least one pigment, at least one filler and at least one natural and/or synthetic resin, an improvement which comprises using as the pigment an aged product obtained by heating 4,4'-bis[acetoacet(2'',5''-dimethoxy-4''-chloro)anilido-2-azo]-3,3'-dichlorodiphenyl in an organic solvent or an aqueous alkali solution, under atmospheric or increased pressure.

2. The paint according to claim 1, wherein the natural and synthetic resin is at least one member selected from the croup consisting of rosin, petroleum resins, melamine resins, synthetic rubbers, phthalic resins, acrylic resins and phenolic resins.

3. The paint according to claim 1, wherein the pigment is used in an amount of about 0.5 to 10 percent by weight based on the whole system.

4. The paint according to claim 1, wherein the filler is used in an amount of about 40 to 70 percent by weight based on the whole system.

5. The paint according to claim 1, wherein the resin is used in an amount of about 20 to 30 percent by weight based on the whole system.

6. A method for road-marking, which comprises using the thermoplastic traffic paint according to claim 1.

* * * * *